US012663153B2

(12) United States Patent
Harding

(10) Patent No.: US 12,663,153 B2
(45) Date of Patent: Jun. 23, 2026

(54) COMBUSTOR APPARATUS

(71) Applicant: ROLLS-ROYCE PLC, London (GB)

(72) Inventor: Stephen C Harding, Bristol (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 18/652,193

(22) Filed: May 1, 2024

(65) Prior Publication Data

US 2024/0392968 A1 Nov. 28, 2024

(30) Foreign Application Priority Data

May 23, 2023 (GB) ...................................... 2307702

(51) Int. Cl.
*F23R 3/14* (2006.01)
*B33Y 80/00* (2015.01)
*F02C 3/06* (2006.01)

(52) U.S. Cl.
CPC ................ *F23R 3/14* (2013.01); *B33Y 80/00* (2014.12); *F02C 3/06* (2013.01)

(58) Field of Classification Search
CPC .... F23R 3/14; F23R 3/286; F23R 3/42; F23R 3/46; F23R 3/50; F23R 2900/00018; B33Y 80/00; F02C 3/06
See application file for complete search history.

(56) References Cited

U.S. PATENT DOCUMENTS 2,674,090 A * 4/1954 Highberg ................... F23R 3/46
                                                        60/804
3,540,682 A * 11/1970 Ferguson ................... F02K 3/06
                                                        60/797

5,161,946 A 11/1992 Bortz et al.
5,211,675 A 5/1993 Bardey et al.
5,761,907 A 6/1998 Pelletier et al.
6,050,096 A * 4/2000 Senior .................... F23D 14/62
                                                        60/737
6,460,344 B1 10/2002 Steinthorsson et al.
10,859,001 B1 12/2020 Spruce
12,007,117 B1 6/2024 Boardman
(Continued)

FOREIGN PATENT DOCUMENTS

CA 2 913 910 A1 6/2016
CN 101307916 A 11/2008
(Continued)

OTHER PUBLICATIONS

Pratt and Whitney JT8D Engine, 1964 (Year: 1964).*
(Continued)

*Primary Examiner* — Steven M Sutherland
(74) *Attorney, Agent, or Firm* — Oliff PLC

(57) ABSTRACT

An integral guide vane combustor assembly for a gas turbine engine comprises an annular array of radially extending guide vane combustors. The gas turbine engine comprises, in axial flow sequence, a compressor assembly, the integral guide vane combustor assembly, a turbine assembly, and an exhaust assembly. Each of the guide vane combustors comprises, in axial flow sequence, a guide vane portion, and a combustor body portion. The guide vane portion is formed integrally with the combustor body portion, and the guide vane portion is configured to direct a gas flow exiting the compressor assembly into the combustor body portion.

10 Claims, 7 Drawing Sheets

(56) References Cited

U.S. PATENT DOCUMENTS

| | | | |
|---|---|---|---|
| 2003/0163983 A1* | 9/2003 | Seda | F02K 3/072 60/39.162 |
| 2006/0123791 A1* | 6/2006 | Macquisten | F23R 3/50 60/725 |
| 2007/0125093 A1 | 6/2007 | Burd et al. | |
| 2007/0289305 A1 | 12/2007 | Oda et al. | |
| 2010/0205971 A1* | 8/2010 | Williams | F23R 3/28 60/748 |
| 2010/0307161 A1 | 12/2010 | Thomson et al. | |
| 2011/0016868 A1 | 1/2011 | Oda et al. | |
| 2011/0120134 A1 | 5/2011 | Hoke et al. | |
| 2011/0203286 A1* | 8/2011 | Wagner | F23C 3/00 60/752 |
| 2011/0206498 A1 | 8/2011 | McCooey | |
| 2012/0047903 A1 | 3/2012 | Williams et al. | |
| 2012/0228397 A1 | 9/2012 | Thomson | |
| 2012/0292408 A1 | 11/2012 | Short | |
| 2012/0304649 A1 | 12/2012 | Matsuyama et al. | |
| 2012/0305673 A1 | 12/2012 | Matsuyama et al. | |
| 2013/0086908 A1 | 4/2013 | Negulescu | |
| 2013/0255263 A1 | 10/2013 | Wilson et al. | |
| 2014/0241856 A1 | 8/2014 | Roberge et al. | |
| 2014/0241871 A1 | 8/2014 | Gregory et al. | |
| 2014/0291418 A1 | 10/2014 | Ruffing et al. | |
| 2014/0318135 A1* | 10/2014 | Knapp | F23R 3/46 60/737 |
| 2014/0339339 A1 | 11/2014 | Prociw | |
| 2014/0345286 A1 | 11/2014 | Zupanc et al. | |
| 2014/0352321 A1* | 12/2014 | Haynes | F02K 3/00 60/776 |
| 2015/0089920 A1 | 4/2015 | Ford et al. | |
| 2015/0167986 A1 | 6/2015 | Montgomery et al. | |
| 2015/0247641 A1 | 9/2015 | Patel et al. | |
| 2015/0253010 A1 | 9/2015 | Schlein | |
| 2015/0285158 A1 | 10/2015 | Hillel et al. | |
| 2016/0209037 A1 | 7/2016 | Dai et al. | |
| 2016/0209038 A1 | 7/2016 | Kopp-Vaughan et al. | |
| 2016/0215982 A1 | 7/2016 | Pfeffer et al. | |
| 2016/0363320 A1 | 12/2016 | Benjamin et al. | |
| 2016/0377293 A1 | 12/2016 | Short et al. | |
| 2017/0009995 A1 | 1/2017 | Witham et al. | |
| 2017/0082288 A1 | 3/2017 | Ryon et al. | |
| 2017/0089582 A1 | 3/2017 | Carrotte et al. | |
| 2017/0146243 A1 | 5/2017 | Siders et al. | |
| 2017/0248319 A1 | 8/2017 | McMahan et al. | |
| 2017/0284673 A1 | 10/2017 | Williams | |
| 2018/0304281 A1* | 10/2018 | Wirtz | F23R 3/12 |
| 2019/0056108 A1 | 2/2019 | Li et al. | |
| 2019/0170355 A1 | 6/2019 | Tentorio et al. | |
| 2020/0025386 A1 | 1/2020 | Muldal et al. | |
| 2020/0191093 A1 | 6/2020 | Boardman et al. | |
| 2020/0362724 A1 | 11/2020 | Binek et al. | |
| 2020/0408407 A1 | 12/2020 | Tentorio et al. | |
| 2020/0408408 A1 | 12/2020 | Tentorio et al. | |
| 2021/0062723 A1 | 3/2021 | McCune | |
| 2021/0222881 A1* | 7/2021 | D'Agostini | F02C 7/08 |
| 2021/0301827 A1 | 9/2021 | Stretton et al. | |
| 2022/0056811 A1 | 2/2022 | Molesini et al. | |
| 2022/0112866 A1 | 4/2022 | Wong et al. | |
| 2022/0178543 A1 | 6/2022 | Tentorio et al. | |
| 2023/0003387 A1 | 1/2023 | Nakamura | |
| 2023/0166855 A1 | 6/2023 | Gallagher et al. | |
| 2023/0184128 A1 | 6/2023 | Davies et al. | |
| 2024/0044293 A1 | 2/2024 | Snyder | |
| 2024/0044496 A1 | 2/2024 | Snyder | |
| 2024/0159191 A1 | 5/2024 | Sibbach et al. | |

FOREIGN PATENT DOCUMENTS

| | | | | |
|---|---|---|---|---|
| CN | 103335333 A | 10/2013 | | |
| CN | 103697500 A | 4/2014 | | |
| CN | 109477638 A | * 3/2019 | | F02C 3/04 |
| CN | 218209685 U | 1/2023 | | |
| EP | 3 115 692 A1 | 1/2017 | | |
| EP | 3147571 A1 | 3/2017 | | |
| GB | 2516445 A | 1/2015 | | |
| GB | 2570035 A | 7/2019 | | |
| GB | 2581417 A | 8/2020 | | |
| GB | 2601564 A | 6/2022 | | |
| JP | 2009-074798 A | 4/2009 | | |
| JP | 2011-208938 A | 10/2011 | | |

OTHER PUBLICATIONS

Nov. 20, 2023 Combined Search and Examination Report Issued in British Patent Patent Application No. GB2307703.5.

Nov. 20, 2023 Combined Search and Examination Report Issued in British Patent Patent Application No. GB2307704.3.

Nov. 17, 2023 Combined Search and Examination Report Issued in British Patent Patent Application No. GB2307700.1.

U.S. Appl. No. 18/652,125, filed May 1, 2024 in the name of Harding.

U.S. Appl. No. 18/652,143, filed May 1, 2024 in the name of Harding.

U.S. Appl. No. 18/652,159, filed May 1, 2024 in the name of Kannan et al.

U.S. Appl. No. 18/652,134, filed May 1, 2024 in the name of Witham.

Nov. 23, 2023 Combined Search and Examination Report Issued in British Patent Patent Application No. GB2307701.9.

Nov. 24, 2023 Combined Search and Examination Report Issued in British Patent Patent Application No. GB2307702.7.

Oct. 4, 2024 Extended European Search Report issued in European Patent Application No. 24172141.4.

Oct. 4, 2024 Extended European Search Report issued in European Patent Application No. 24172140.6.

Oct. 14, 2024 Extended Search Report issued in European Patent Application No. 24172145.5.

Oct. 11, 2024 Extended European Search Report issued in European Patent Application No. 24172143.0.

Mar. 19, 2025 Notice of Allowance issued in U.S. Appl. No. 18/652,159.

* cited by examiner

View on C-C

COMBUSTOR APPARATUS

This disclosure claims the benefit of UK Patent Application No. GB 2307702.7, filed on 23 May 2023, which is hereby incorporated herein in its entirety.

FIELD OF THE DISCLOSURE

The present disclosure relates to an improved combustor apparatus and particularly, but not exclusively, to an improved combustor apparatus for a gas turbine engine.

BACKGROUND TO THE DISCLOSURE

It is known to use fuel swirl nozzles as part of a combustion apparatus in a gas turbine engine. The combustion apparatus instigates and facilitates combustion of fuel with relatively high-pressure air received from a compressor stage of the gas turbine engine and thereby adds thermal energy to the relatively high-pressure air prior to the air being expanded in a turbine stage of the gas turbine engine and subsequently being exhausted at an exhaust nozzle to provide propulsive thrust. In the turbine stage, energy is extracted from the expanding air in the form of mechanical work. The turbine stage may drive, for example, a propulsive fan which provides additional propulsive thrust to the gas turbine engine.

The performance of the fuel swirl nozzle and the combustor is important for effective and efficient operation of the gas turbine engine. In particular, the performance of both the fuel swirl nozzle and the combustor is directly linked to the thermal efficiency of the gas turbine engine and/or emissions produced by the gas turbine engine. It is therefore desirable to provide an improved fuel swirl nozzle and combustor for a gas turbine engine.

STATEMENTS OF DISCLOSURE

According to a first aspect of the present disclosure there is provided an integral guide vane combustor assembly for a gas turbine engine, the gas turbine engine comprising, in axial flow sequence, a compressor assembly, the integral guide vane combustor assembly, a turbine assembly, and an exhaust assembly, the integral guide vane combustor assembly comprising an annular array of radially extending guide vane combustors;

wherein each guide vane combustor comprises, in axial flow sequence, a guide vane portion, and a combustor body portion, the guide vane portion being formed integrally with the combustor body portion, and the guide vane portion being configured to direct a gas flow exiting the compressor assembly into the combustor body portion.

The integration of the guide vane portion with the combustor body portion makes the axial length of the integral guide vane combustor assembly less then an axial length of a conventional arrangement of separate nozzle guide vane at the exit from the compressor assembly, and combustor assembly. This reduction in axial length makes the gas turbine engine lighter, and more easily integrated into a power application for an end user.

The guide vane portion provides a flow straightening function to a gas flow exiting the compressor assembly such that this gas flow is aligned with a longitudinal axis of the engine. This enables a fuel flow to be more efficiently mixed with the gas flow in the combustor.

Optionally, the annular array of guide vane combustors comprises between 6 and 16 guide vane combustors.

The quantity of guide vane combustors can be selected to provide a uniform distribution of the atomised fuel/air mixture around the annular form of the combustor. This in turn will provide an equal combustion around the circumference of the combustor, which will optimise the combustor efficiency.

Optionally, the annular array of guide vane combustors are circumferentially equally spaced.

In one arrangement, the guide vane combustors are circumferentially equi-spaced in the annular array. This equi-spaced arrangement ensures that the combustion process extends fully symmetrically around a circumference of the engine, which will improve the overall combustion efficiency In another arrangement, the guide vane combustors may be circumferentially unequally spaced around the combustor assembly. This may be advantageous to counteract a circumferentially uneven flow exiting the compressor assembly, for example due to the presence of a fixed pylon extending across the flow path. A circumferentially unequal spacing between the guide vane combustors may serve to compensate for the aforementioned flow blockage and return the combustion process to a circumferentially equal distribution.

Optionally, each guide vane combustor is formed by an additive layer manufacturing process.

The process of additive layer manufacturing enables the guide vane portion and the combustor body portion to be integrally formed while minimising fluid drag over an external surface of the guide vane combustor.

Optionally, the gas flow entering the guide vane portion is directed at a first offset angle relative to a longitudinal axis of the gas turbine engine, and the gas flow exiting the guide vane portion is directed at a second offset angle relative to a longitudinal axis of the gas turbine engine, and the second offset angle is less than the first offset angle.

The air flow exiting the compressor assembly is directed at a first offset angle relative to a longitudinal axis of the gas turbine engine. The guide vane portion is arranged to redirect this air flow such that the flow is directed at a second offset angle, where the second offset angle is less than the first offset angle.

In this way, the air flow entering the combustor body portion is generally aligned with the longitudinal axis of the gas turbine engine. This ensures that the air flow entering the combustor body portion is more easily and efficiently mixed with an atomised flow of fuel prior to the combustion process.

Optionally, the second offset angle is in a range of from +5° to −5°.

While an air flow entering the combustor body portion might ideally be always aligned with a longitudinal axis of the gas turbine engine, it has been found that minor variations of up to 5° from this longitudinal axis still permit an efficient and complete mixture between the air flow and the atomised fuel.

Optionally, the gas turbine engine comprises, in axial flow sequence, a fan assembly, a compressor assembly, a combustor assembly, a turbine assembly, and an exhaust assembly, wherein the combustor assembly comprises a plurality of fuel swirl nozzles.

A typical turbofan engine assembly will comprise inter alia a circumferential array of fuel swirl nozzles. For efficient operation of the engine, it is desirable that each of the fuel swirl nozzles has a common fuel/air atomisation characteristic.

Optionally, the fan assembly comprises a plurality of fan blades extending radially from a hub, the plurality of fan blades defining a fan diameter ($D_{FAN}$), and wherein the fan diameter $D_{FAN}$ is within the range of 0.3 m to 2.0 m, preferably within the range 0.4 m to 1.5 m, and more preferably in the range of 0.7 m to 1.0 m.

In one embodiment of the disclosure, the fan diameter is 0.9 m.

Consequently, for the same heat energy loading rejected to the air flow through the heat exchanger, the loss in propulsive efficiency of the turbofan engine is proportionately smaller for a large diameter (for example, approximately 1.5 to 2.0 m in diameter) turbofan engine than for a small diameter turbofan engine.

The fan tip diameter, measured across a centreline of the engine and between an outermost tip of opposing fan blades at their leading edge, may be in the range from 95 cm to 200 cm, for example in the range from 110 cm to 150 cm, or alternatively in the range from 155 cm to 200 cm. The fan tip diameter may be greater than any of: 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip diameter may be around 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip diameter may be greater than 160 cm.

The fan tip diameter may be in the range from 95 cm to 150 cm, optionally in the range from 110 cm to 150 cm, optionally in the range of from 110 cm to 145 cm, and further optionally in the range from 120 cm to 140 cm.

The fan tip diameter may be in the range from 155 cm to 200 cm, optionally in the range from 160 cm to 200 cm, and further optionally in the range from 165 cm to 190 cm.

Optionally, the turbofan gas turbine engine further comprises an outer casing, the outer casing enclosing the sequential arrangement of fan assembly, compressor module, and turbine module, an annular bypass duct being defined between the outer casing and the sequential arrangement of compressor module, and turbine module, a bypass ratio being defined as a ratio of a mass air flow rate through the bypass duct to a mass air flow rate through the sequential arrangement of modules, and wherein the bypass ratio is less than 4.0.

A turbofan engine having a bypass ratio (BPR) of less than approximately 4.0 will have a generally smaller bypass duct (the annular duct surrounding the core gas turbine engine) than a turbofan engine having a BPR greater than approximately 4.0. For a turbofan engine with a BPR greater than, say, 4.0, the correspondingly larger bypass duct volume provides more scope for positioning a heat exchanger within the bypass duct than would be the case for a low BPR turbofan engine.

Optionally, the fan assembly has two or more fan stages, at least one of the fan stages comprising a plurality of fan blades defining the fan diameter $D_{FAN}$.

Providing the fan assembly with two or more fan stages enables the pressure ratio of the fan assembly to be increased without having to increase a fan diameter.

According to a further aspect of the present disclosure there is provided a fuel swirl nozzle for a gas turbine engine, the fuel swirl nozzle comprising, in axial fuel flow sequence, a fuel inlet portion, a fuel stem portion, and a fuel/air swirler portion, the fuel inlet portion is configured to receive a flow of a fuel, an inlet to the fuel stem portion being fluidly sealed against the fuel inlet portion, and an outlet from the fuel stem portion being fluidly sealed against the fuel/air swirler portion; and wherein the fuel/air swirler portion comprises an outer air swirler and an inner air swirler, the inner air swirler being positioned concentrically within the outer air swirler, the outer air swirler comprising a plurality of first vanes arranged in an annular array within an outer air swirler body and configured to impose a first rotational flow component on an air flow entering the outer air swirler, the inner air swirler having a plurality of second vanes arranged in an annular array within an inner air swirler body and configured to impose a second rotational flow component on an air flow entering the inner air swirler, the fuel stem portion passing radially inwardly through the outer air swirler to a region radially between the outer air swirler and the inner air swirler, the inner air swirler further comprising an annular fuel gallery formed on a radially outwardly facing surface such that the flow of fuel enters the fuel gallery prior to being atomised into the air flow passing through the inner air swirler, and then further atomised into the air flow passing through the outer air swirler.

The fuel stem portion passes radially through the outer air swirler to deliver fuel to the region between the outer air swirler and the inner air swirler. This enables an axial length of the fuel swirl nozzle to be reduced, which in turn allows the size and mass of the fuel/air swirler portion to be reduced. A reduced mass fuel/air swirler portion then enables the fuel stem, that supports the fuel/air swirler portion, to also be reduced in weight.

By moving the outer air swirler axially upstream (relative to prior art arrangements of fuels spray nozzle) it becomes possible to increase the pre-mixing length for the air and fuel upstream of the fuel swirl nozzle throat. This increases the fuel-air mixing efficiency of the fuel swirl nozzle.

By forming the fuel/air swirler portion from only two components, namely the outer air swirler and the inner air swirler, there is only a single component interface whose dimensions must be carefully controlled. This makes the fuel swirl nozzle simpler to assemble and easier for a user to maintain the necessary component tolerances during assembly, than for conventional fuel swirl nozzles whose fuel/air swirlers comprise multiple sub-components all requiring close tolerances in order to achieve efficient operation.

Optionally, at least one of the outer air swirler and the inner air swirler is formed by an additive layer manufacturing process.

The use of an additive layer manufacturing process to form either or both of the outer air swirler and the inner air swirler enables the plurality of corresponding first and second vanes to be formed integrally with the respective one of the outer air swirler body and inner air swirler body. This makes the air swirler more compact and lighter than the prior art equivalent.

Forming either or both of the outer air swirler and the inner air swirler by an additive layer manufacturing process further enables the forming of a geometrical arrangement of corresponding first and second vanes that cannot be produced by conventional (i.e. casting, forging, machining, etc.) forming processes. For example, the first and second vanes may have a re-entrant geometry.

Optionally, the outer air swirler and the inner air swirler are joined to one another by a brazing process.

In one arrangement, the outer air swirler and the inner air swirler are each formed by an additive layer manufacturing process and are joined to one another by a brazing process. This enables the outer air swirler to be machined in the region where the fuel stem passes radially inwardly through the outer air swirler, prior to assembly of the inner air swirler, outer air swirler and fuel stem.

Optionally, an annular fuel gallery is formed between a radially inwardly facing surface of the outer air swirler and the radially outwardly facing surface of the inner air swirler.

The fuel stem portion extends radially inwardly through the outer air swirler and terminates at the interface between the outer air swirler and the inner air swirler. In this way, a flow of fuel along the fuel stem portion is provided to the fuel gallery prior to the atomisation of the fuel into the air flow passing through the outer air swirler and the inner air swirler.

Optionally, the fuel swirl nozzle further comprises at least one of, a first sealing element provided between the fuel inlet portion and the inlet to the fuel stem portion, and a second sealing element provided between the outlet from the fuel stem portion, and the fuel/air swirler portion.

The use of a first sealing element between the fuel inlet portion and the inlet to the fuel stem portion allows for the mating surfaces of the fuel inlet portion and the inlet to the fuel stem portion to be formed with broad manufacturing tolerances, with the first sealing element providing a fluid-tight seal at the joint. This allows for the fuel inlet portion and the fuel stem portion to be manufactured at lower cost. The same argument applies to the use of a second sealing element between the outlet from the fuel stem portion, and the fuel/air swirler portion.

Optionally, at least one of the first sealing element and the second sealing element is an 'O'-ring.

The use of an 'O'-ring for either or both of the first sealing element and the second sealing element provides a simple, reliable, and cost-effective means of providing a fluid-tight seal between the corresponding mating surfaces.

The 'O'-ring forming the first sealing element may be captive within the fuel inlet portion, which simplifies assembly of the fuel stem portion into the fuel inlet portion. Likewise, the 'O'-ring forming the second sealing element may be captive within the fuel/air swirler portion, which simplifies assembly of the fuel stem portion into the fuel/air swirler portion.

Optionally, the fuel swirl nozzle further comprises a fuel stem shroud, the fuel stem shroud enclosing an axial length of the fuel stem portion, the fuel stem portion having a first cross-sectional profile with a corresponding first drag coefficient, wherein the fuel stem shroud has a second cross-sectional profile with a corresponding second drag coefficient, in which the second drag coefficient is less than the first drag coefficient.

In one arrangement, the fuel stem portion is produced from a conventional cylindrical tube material. While this material choice simplifies the provision of a fluid-tight seal at each end, the cylindrical cross-sectional profile generates aerodynamic inefficiencies from the core engine sir flow passing over them before entry to the combustor assembly.

The addition of a fuel stem shroud that encloses the fuel stem portion, where the fuel stem shroud has a cross-sectional profile that is more streamlined than the cylindrical cross-sectional profile of the fuel stem portion, will reduce flow vortices, wakes, and other aerodynamic inefficiencies from the air flow passing over the fuel stem region.

Optionally, the second cross-sectional profile is generally lachrymiform shaped along an axis parallel to the engine longitudinal axis.

The use of a lachrymiform shaped cross-sectional profile for the fuel stem shroud provides for an aerodynamically more efficient air flow across the fuel stem region than for the air flow over the fuel stem portion, which has a cylindrical cross-sectional profile.

Optionally, the fuel inlet portion is formed as a monolithic additive layer manufactured component.

The use of an additive layer manufacturing process to form the fuel inlet element allows the internal flow passage (s) of the fuel inlet element to be formed with a streamlined axial profile. This minimises flow losses in the fuel flow and makes the flow of the fuel more laminar in profile.

Optionally, the fuel inlet portion comprises a fluid restrictor, the fluid restrictor being configured to limit the flow of fuel through the fuel inlet portion.

The use of a fluid restrictor in the fuel inlet portion allows a user to ensure that the fuel swirl nozzle can, in a maximum flow condition, pass only a pre-determined maximum flow rate of fuel. This is useful for the user to be able to balance the fuel supplied to multiple fuel swirl nozzles in a single engine, which in turn is important for the efficient operation of the engine.

Optionally, the plurality of first vanes induce a rotational flow component having a first swirl angle relative to the longitudinal axis of the engine, and the plurality of second vanes induce a rotational flow component having a second swirl angle relative to the longitudinal axis of the engine, with the first swirl angle being different to the second swirl angle.

In one arrangement, the first swirl angle is approximately 10°, while the second swirl angle is approximately 20°. In this way, the flow of the air/fuel mixture through the inner air swirler has a greater amount of swirl rotation than the flow of the air/fuel mixture through the outer air swirler. In an alternative arrangement, the first swirl angle is approximately 20°, while the second swirl angle is approximately 10°.

This difference in swirl rotation angle between the flows through the outer air swirler and the inner air swirler increases the efficiency of the atomisation of the fuel into the air flow entering the fuel swirl nozzle, which in turn increases the combustion efficiency of the combustor.

Optionally, the plurality of first vanes induce a rotational flow component in a first rotational direction, and the plurality of second vanes induce a rotational flow component in a second rotational direction, the first rotational direction being opposite to the second rotational direction.

In one arrangement, the plurality of first vanes in the outer air swirler direct an airflow entering the outer air swirler in a first rotational direction, while the plurality of second vanes in the inner air swirler direct an airflow entering the inner air swirler in a second rotational direction. The first rotational direction is in an opposite sense to the second rotational direction.

For example, the first rotational direction may be clockwise, when viewed towards an inlet face of the fuel/air swirler assembly, while the second rotational direction may be anti-clockwise when viewed in the same direction.

Directing the air flow through the first vanes in a first rotational direction assists in the atomisation of the fuel into the air flow through the first vanes. Subsequently directing the atomised fuel/air flow through the second vanes in a second opposite rotational direction will further atomise the fuel/air mixture prior to entry of the fuel/air mixture into the combustor volume, Optionally, a heat shielding portion is provided between the outer air swirler and the inner sir swirler, the heat shielding portion being configured to reduce a transfer of thermal energy between the outer air swirler and the inner air swirler.

A reduced transfer of thermal energy between the outer air swirler and the inner air swirler is advantageous because it minimises a transfer of thermal energy into the fuel prior to the fuel being atomised with the incoming air flow in the fuel/air swirler assembly. The transfer of thermal energy to the fuel prior to its atomisation is undesirable because it can reduce the effectiveness of the atomisation process, which in turn reduces the efficiency of the engine in operation.

In one arrangement, the heat shielding portion is integrally formed with the outer air swirler either on or at a radially inwardly facing surface of the outer air swirler that is oriented towards a radially outwardly facing surface of the inner air swirler. This could be a surface treatment that is applied to the radially inwardly facing surface of the outer air swirler, or alternatively could be a discrete material layer that is moulded or cast into the radially inwardly facing surface of the outer air swirler.

In another arrangement, the heat shielding portion is integrally formed with the inner air swirler either on or at a radially outwardly facing surface of the inner air swirler that is oriented towards a radially inwardly facing surface of the outer air swirler. This could be a surface treatment that is applied to the radially outwardly facing surface of the inner air swirler, or alternatively could be a discrete material layer that is moulded or cast into the radially outwardly facing surface of the inner air swirler.

In a further alternative arrangement, the heat shielding portion may be an annular air gap that is maintained between a radially inwardly facing surface of the outer air swirler and a radially outwardly facing surface of the inner air swirler.

According to a further aspect of the present disclosure there is provided a method of manufacturing a fuel swirl nozzle for a gas turbine engine, the fuel swirl nozzle comprising, in axial fuel flow sequence, a fuel inlet portion, a fuel stem portion, and a fuel/air swirler portion, the method comprising the steps of:

(a) forming the fuel inlet portion;

(b) forming the fuel stem portion;

(c) forming an outer air swirler comprising a plurality of first vanes arranged in an annular array within an outer air swirler body, and an inner air swirler comprising a plurality of second vanes arranged in an annular array within an inner air swirler body with an annular fuel gallery being formed on a radially outwardly facing surface of the inner air swirler body;

(d) positioning the inner air swirler concentrically within the outer air swirler to form the fuel/air swirler portion;

(e) assembling the fuel inlet portion to a first end of the fuel stem portion; and (f) assembling a second end of the fuel stem portion to the fuel/air swirler portion, the fuel stem portion passing radially inwardly through the outer air swirler to a region radially between the outer air swirler and the inner air swirler to form the fuel swirl nozzle.

The fuel stem portion passes radially through the outer air swirler to deliver fuel to the region between the outer air swirler and the inner air swirler. This enables an axial length of the fuel swirl nozzle to be reduced, which in turn allows the size and mass of the fuel/air swirler portion to be reduced. A reduced mass fuel/air swirler portion then enables the fuel stem portion, that supports the fuel/air swirler portion, to also be reduced in weight.

By moving the outer air swirler axially upstream (relative to prior art arrangements of fuels spray nozzle) it becomes possible to increase the pre-mixing length for the air and fuel upstream of the fuel swirl nozzle throat. This increases the fuel-air mixing efficiency of the fuel swirl nozzle.

By forming the fuel/air swirler portion from only two components, namely the outer air swirler and the inner air swirler, there is only a single component interface whose dimensions must be carefully controlled. This makes the fuel swirl nozzle simpler to assemble and easier for a user to maintain the necessary component tolerances during assembly, than for conventional fuel swirl nozzles whose fuel/air swirlers comprise multiple sub-components all requiring close tolerances in order to achieve efficient operation.

According to a further aspect of the present disclosure there is provided a fuel swirl nozzle for a gas turbine engine, the gas turbine engine having a longitudinal axis, the fuel swirl nozzle comprising, in axial fuel flow sequence, a fuel inlet portion, a fuel stem portion, and a fuel/air swirler portion, an inlet to the fuel stem portion being fluidly sealed against the fuel inlet portion, and an outlet from the fuel stem portion being fluidly sealed against the fuel/air swirler portion; and wherein the fuel/air swirler portion has a cross-sectional profile being generally dolioform shaped along an axis parallel to the engine longitudinal axis, and having a first end and a second end, the first end being an air inlet face to the fuel/air swirler portion, and the second end being a fuel/air mixture outlet face from the fuel/air swirler portion, the first end comprising a rim portion enclosing the air inlet face where the rim portion has a rim portion radius ($r_{rim}$) normal to an outer circumference of the inlet face.

The rim portion is the outer circumferential region of the first end of the fuel/air swirler portion. In other words, it is the peripheral region of the air inlet face of the fuel/air swirler portion.

Forming the rim portion with a rim portion radius makes the fuel/air swirler portion more aerodynamically streamlined relative to an approaching air flow. This in turn reduces aerodynamic losses as an air flow passes around and through the fuel/air swirler portion.

Optionally, the air inlet face has a radius R in a plane normal to the engine longitudinal axis, and the rim portion radius $r_{rim}$ is in a range of:

$$(0.4 * R) < r_{rim} < (1.2 * R)$$

where: $r_{rim}$ is the rim portion radius, and

R is a radius of the air inlet face.

By forming the rim portion of the air inlet face of the fuel/air swirler with a rim radius of 0.4 to 1.2 times the radius of the air inlet face itself, it becomes possible to prevent flow separation of the air flow passing over the rim portion. This reduces aerodynamic losses and provides a smoothed air flow around the external surfaces of the fuel/air swirler, which in turn improves the blending of this air flow with the atomised fuel/air stream that exits from the fuel/air swirler itself.

Optionally, the fuel/air swirler comprises two or more swirler portions, wherein at least one of the swirler portions is formed by an additive layer manufacturing process.

The use of two or more swirler portions forming the fuel/air swirler improves the atomisation of fuel with the air flow passing through the fuel/air swirler portion, prior to this atomised fuel/air mixture being blended with the air flow passing over the outwardly facing surface of the fuel/air swirler portion.

Optionally, the fuel stem portion is an elongate cylinder having an outer diameter D, the fuel stem portion having a first connection to the fuel inlet portion, and a second connection to the fuel/air swirler portion, and at least one of the first connection and the second connection comprises a blended joint having a joint blend radius, $r_{blend}$.

The blended joint at either or both of the first connection and the second connection provides for a smooth, curved transition between the outer surface of the fuel stem portion and the fuel inlet portion and the fuel/air swirler portion respectively. This smooth transition prevents the formation of flow separation from the surface, which in turn makes the flow unstable.

Optionally, the joint blend radius $r_{blend}$ is in a range of:

$$(0.5 * D) < r_{blend} < (1.0 * D)$$

where: $r_{blend}$ is the joint blend radius, and
D is the diameter of the fuel stem portion.

By forming the blended joint at either or both of the first connection and the second connection with a joint blend radius of 0.5 to 1.0 times the diameter of the fuel stem portion, it becomes possible to prevent flow separation of the air flow passing over the fuel swirl nozzle. This reduces aerodynamic losses and provides a smoothed air flow around the external surfaces of the fuel swirl nozzle, which in turn improves the blending of this air flow with the atomised fuel/air stream that exits from the fuel/air swirler portion.

Optionally, the fuel swirl nozzle further comprises a fuel stem shroud, the fuel stem shroud enclosing an axial length of the fuel stem portion, the fuel stem portion having a first cross-sectional profile with a corresponding first drag coefficient, wherein the fuel stem shroud has a second cross-sectional profile with a corresponding second drag coefficient, in which the second drag coefficient is less than the first drag coefficient.

In one arrangement, the fuel stem portion is produced from a conventional cylindrical tube material. While this material choice simplifies the provision of a fluid-tight seal at each end, the cylindrical cross-sectional profile generates aerodynamic inefficiencies from the core engine sir flow passing over them before entry to the combustor assembly.

The addition of a fuel stem shroud that encloses the fuel stem portion, where the fuel stem shroud has a cross-sectional profile that is more streamlined than the cylindrical cross-sectional profile of the fuel stem, will reduce flow vortices, wakes, and other aerodynamic inefficiencies from the air flow passing over the fuel stem region.

Optionally, the second cross-sectional profile is generally lachrymiform shaped along an axis parallel to the engine longitudinal axis.

The use of a lachrymiform shaped cross-sectional profile for the fuel stem shroud provides for an aerodynamically more efficient air flow across the fuel stem region than for the air flow over the fuel stem portion, which has a cylindrical cross-sectional profile.

Optionally, Optionally, the fuel inlet portion comprises a fluid restrictor, the fluid restrictor being configured to limit the flow of fuel through the fuel inlet portion.

The use of a fluid restrictor in the fuel inlet portion allows a user to ensure that the fuel swirl nozzle can, in a maximum flow condition, pass only a pre-determined maximum flow rate of fuel. This is useful for the user to be able to balance the fuel supplied to multiple fuel swirl nozzles in a single engine, which in turn is important for the efficient operation of the engine.

According to a further aspect of the present disclosure there is provided a combustor assembly for a gas turbine engine, the combustor assembly comprising a combustor casing, the combustor casing having a diametral height D and an axial length L; and wherein an Aspect Ratio parameter S is defined as:

$$S = \frac{D}{L}$$

and the S parameter lies in the range of 0.30 to 1.00.

The Aspect Ratio parameter S defines the proportions of the axial cross-sectional profile through the combustor casing.

Conversely, a value for the parameter S that is near to the lower bound for the claimed range (i.e., close to 0.30) defines a combustor casing in which the diametral height is approximately one-third of the axial length. In other words, the combustor casing is axially longer than it is diametrally high. This combustor casing geometry provides for a combustor casing shape that has been found to improve the combustion efficiency by providing additional combustor space axially. This allows for more complete combustion of the fuel-air mixture emerging from the fuel swirl nozzles.

A value for the parameter S that is near to the upper bound for the claimed range (i.e., close to 1.00) defines a combustor casing in which the diametral height is almost equal to the axial length. Reducing the value of the parameter S results in the combustor casing shape becoming both axially shorter and diametrally wider. The above-mentioned advantage of an improved combustion efficiency, while slightly reduced is observed through to the upper bound for the parameter S.

Optionally, the Aspect Ratio parameter S is in the range of 0.40 to 0.75.

In one embodiment of the disclosure, the combustor casing is sized such that the parameter S is approximately 0.5. In other words, the axial length of the casing is approximately two times that of the diametral height of the casing.

This enables the benefits of the improved combustion efficiency to be realised while maintaining a relatively small diametral height, which in turn enables the combustor casing to more easily be packaged by a user into the gas turbine engine without increasing an overall diameter of the engine assembly.

Optionally, an internal volume of the combustor casing is in a range of between 0.02 $m^3$ and 0.05 $m^3$.

The internal volume of the combustor casing is sized such that the gas turbine engine produces an output power in a range of between 50 kN and 90 kN.

Optionally, the internal volume of the combustor casing is in a range of between 0.025 $m^3$ and 0.035 $m^3$.

The internal volume of the combustor casing is sized such that the gas turbine engine produces an output power in a range of between 50 kN and 90 kN.

According to a further aspect of the present disclosure there is provided a combustor assembly for a gas turbine engine, the combustor assembly comprising a combustor casing, and an integer quantity N of fuel swirl nozzles, the combustor casing defining a total internal volume of the combustor casing V (cm³); and wherein a Fuel Atomisation Density parameter, $D_{FSN}$ (m⁻³) is defined as:

$$D_{FSN} = \frac{N}{V}$$

and the $D_{FSN}$ parameter is a value in the range of 300 to 1,200.

The Fuel Atomisation Density parameter provides a measure of the extent to which the atomised fuel/air mixture exhausted from the fuel swirl nozzles can be effectively combusted in the combustor casing.

Increasing the quantity of the fuel swirl nozzles will increase the capability of the combustion assembly to more effectively fill the combustor casing with an atomised fuel/air mixture that can subsequently be combusted.

Optionally, the fuel swirl nozzles are pre-filming airblast fuel swirl nozzles.

In one arrangement, the fuel swirl nozzles are pre-filming airblast fuel swirl nozzles that take a fuel feed and, using an arrangement of swirl vanes, atomise this fuel feed into the high-pressure air flow provided by the high-pressure turbine assembly.

Optionally, the $D_{FSN}$ parameter is in the range of 500 to 900.

Embodiments of the disclosure in which the $D_{FSN}$ parameter is in the range of between 500 and 900 provide a balance between the quantity of fuel swirl nozzles and reducing the internal volume of the combustor casing.

Optionally, the total internal volume of the combustor casing is in a range of between 0.02 m³ and 0.05 m³.

The internal volume of the combustor casing is sized such that the gas turbine engine produces an output power in a range of between 50 kN and 90 kN.

Optionally, the total internal volume of the combustor casing is in a range of between 0.025 m³ and 0.035 m³.

The internal volume of the combustor casing is sized such that the gas turbine engine produces an output power in a range of between 50 kN and 90 kN.

As noted elsewhere herein, the present disclosure may relate to a turbofan gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core. The fan may comprise any number of stages, for example multiple stages. Each fan stage may comprise a row of fan blades and a row of stator vanes. The stator vanes may be variable stator vanes (in that their angle of incidence may be variable).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of compressor stages, for example multiple stages. Each compressor stage may comprise a row of rotor blades and a row of stator vanes. The stator vanes may be variable stator vanes (in that their angle of incidence may be variable). The row of rotor blades and the row of stator vanes may be axially offset from each other.

The or each turbine (for example the first turbine and second turbine as described above) may comprise any number of turbine stages, for example multiple stages. Each turbine stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The diameter of the fan may be measured across the engine centreline and between the tips of opposing fan blades at their leading edge. The fan diameter may be greater than (or on the order of) any of: 50 cm, 60 cm, 70 cm (around 27.5 inches), 80 cm (around 31.5 inches), 90 cm, 100 cm (around 39 inches), 110 cm (around 43 inches), 120 cm (around 47 inches), 130 cm (around 51 inches), 140 cm (around 55 inches), 150 cm (around 59 inches), or 160 cm (around 63 inches). The fan diameter may be in an inclusive range bounded by any two of the values in the previous sentence (i.e., the values may form upper or lower bounds), for example in the range of from 50 cm to 70 cm or 90 cm to 130 cm.

The fan face area may be calculated as ΓΤ multiplied by the square of the fan tip radius.

The rotational speed of the fan may vary in use. Generally, the rotational speed is lower for fans with a higher diameter. Purely by way of non-limitative example, the rotational speed of the fan at cruise conditions may be less than 10000 rpm, for example less than 9000 rpm. Purely by way of further non-limitative example, the rotational speed of the fan at cruise conditions for an engine having a fan diameter in the range of from 50 cm to 90 cm (for example 60 cm to 80 cm or 65 cm to 75 cm) may be in the range of from 7000 rpm to 22000 rpm, for example in the range of from 7000 rpm to 16000 rpm, for example in the range of from 7500 rpm to 14000 rpm. Purely by way of further non-limitative example, the rotational speed of the fan at cruise conditions for an engine having a fan diameter in the range of from 90 cm to 150 cm may be in the range of from 4500 rpm to 12500 rpm, for example in the range of from 4500 rpm to 10000 rpm, for example in the range of from 6000 rpm to 10000 rpm.

In use of the turbofan gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.22, 0.23, 0.24, 0.25, 0.26, 0.27, 0.28, 0.29, 0.30, 0.31, 0.32, 0.33, 0.34, 0.35, 0.36, 0.37, 0.38, 0.39 or 0.40 (all values being dimensionless). The fan tip loading may be in an inclusive range bounded by any two of the values in the previous sentence (i.e., the values may form upper or lower bounds), for example in the range of from 0.28 to 0.31, or 0.29 to 0.30.

Turbofan gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 0.4, 0.5, 0.6, 0.7, 0.8, 0.9, 1.0, 1.1, 1.2, 1.3, 1.4, 1.5, 1.6, 1.7, 1.8, 1.9, 2.0, 2.4, 2.8, 3.2, 3.6, or 4.0. The bypass ratio may be in an inclusive range bounded by any two of the values in the previous sentence (i.e., the values may form upper or lower bounds), for example in the range of form of 0.4 to 1.0, 0.5 to 0.9, or 0.6 to 0.9. Alternatively, the bypass ratio may be in a bounded range in the form of 1.0 to 4.0, 1.8 to 3.6, or 2.4 to 3.6. The bypass duct may be substantially annular. The bypass duct may be radially outside the core engine. The radially outer surface of the bypass duct may be defined by a nacelle and/or a fan case.

The overall pressure ratio of a turbofan gas turbine engine as described and/or claimed herein may be defined as the ratio of the stagnation pressure upstream of the fan to the stagnation pressure at the exit of the highest-pressure compressor (before entry into the combustor). By way of non-limitative example, the overall pressure ratio of a gas turbine engine as described and/or claimed herein at cruise may be greater than (or on the order of) any of the following: 10, 15, 20, 25, 30, 35 or 40. The overall pressure ratio may be in an inclusive range bounded by any two of the values in the previous sentence (i.e., the values may form upper or lower bounds), for example in the range of from 20 to 35.

Specific thrust of a turbofan gas turbine engine may be defined as the net thrust of the engine divided by the total mass flow through the engine. At cruise conditions, the specific thrust of an engine as described and/or claimed herein may be less than (or on the order of) any of the following: 800 $Nkg^{-1}$ s, 850 $Nkg^{-1}$ s, 900 $Nkg^{-1}$ s, 950

$Nkg^{-1}$ s, 1000 $Nkg^{-1}$ s, 1050 $Nkg^{-1}$ s, 1100 $Nkg^{-1}$ s, 1150 $Nkg^{-1}$ s, 1200 $Nkg^{-1}$ s, 1250 $Nkg^{-1}$ s, 1300 $Nkg^{-1}$ s, 1350 $Nkg^{-1}$ s, or 1400 $Nkg^{-1}$ s. The specific thrust may be in an inclusive range bounded by any two of the values in the previous sentence (i.e., the values may form upper or lower bounds), for example in the range of from 800 $Nkg^{-1}$ s to 950 $Nkg^{-1}$ s, or 900 $Nkg^{-1}$ s to 1350 $Nkg^{-1}$ s. Such engines may be particularly efficient in comparison with conventional gas turbine engines.

A turbofan gas turbine engine as described and/or claimed herein may have any desired maximum thrust. Purely by way of non-limitative example, a gas turbine as described and/or claimed herein may be capable of producing a maximum thrust of at least (or on the order of) any of the following: 20 kN, 40 kN, 60 kN, 80 kN, 100 kN, 120 kN, 140 kN, 160 kN, 180 kN, or 200 kN. The maximum thrust may be in an inclusive range bounded by any two of the values in the previous sentence (i.e., the values may form upper or lower bounds). Purely by way of example, a gas turbine as described and/or claimed herein may be capable of producing a maximum thrust in the range of from 60 kN to 160 kN, for example 70 kN to 120 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high-pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1500K, 1550K, 1600K, 1650K, 1700K, 1750K, 1800K, 1850K, 1900K, 1950K, or 2000K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K, 2000K, 2050K, 2100K, 2150K, 2200K, 2250K or 2300K. The maximum TET may be in an inclusive range bounded by any two of the values in the previous sentence (i.e., the values may form upper or lower bounds), for example in the range of from 1800K to 2200K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium-based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The turbofan gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan stage of a turbofan gas turbine engine as described and/or claimed herein may have any desired number of fan blades, for example 12, 14, 16, 18, 20, 22, 24, 26, 28, 30, 32, or 34 fan blades.

As used herein, cruise conditions have the conventional meaning and would be readily understood by the skilled person. In this regard, cruise conditions encompass both subsonic cruise conditions and supersonic cruise conditions. Thus, for a given turbofan gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e., maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given turbofan gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the subsonic cruise condition may be any point in the range of from Mach 0.80 to 0.99, for example 0.80 to 0.85, for example 0.85 to 0.90, for example 0.90 to 0.95, for example 0.95 to 0.99, for example in the region of Mach 0.80, in the region of Mach 0.85 or in the range of from 0.80 to 0.85. Any single speed within these ranges may be part of the cruise condition. For some aircraft, the cruise conditions may be outside these ranges, for example below Mach 0.80.

Purely by way of example, the forward speed at the supersonic cruise condition may be any point in the range of from Mach 1.20 to 2.20, for example 1.35 to 2.10, for example 1.50 to 2.05, for example in the region of Mach 2.00 or in the range of from 1.80 to 2.00. Any single speed within these ranges may be part of the cruise condition. For some aircraft, the cruise conditions may be outside these ranges, for example between Mach 1.0 and 1.20, or above Mach 2.20.

Purely by way of example, the supersonic cruise conditions may correspond to standard atmospheric conditions (according to the International Standard Atmosphere, ISA) at an altitude that is in the range of from 11000 m to 19000 m, for example in the range of from 12500 m to 17000 m, for example in the range of from 15000 m to 17000 m (around 56000 ft), for example in the range of from 16000 m to 17000 m, for example in the region of 17000 m. The cruise conditions may correspond to standard atmospheric conditions at any given altitude in these ranges.

Purely by way of example, the subsonic cruise conditions may correspond to an operating point of the engine that provides a known required thrust level (for example a value in the range of from 40 kN to 65 kN) at a forward Mach number of 0.8 and standard atmospheric conditions (according to the International Standard Atmosphere) at an altitude of 38000 ft (11582 m). Purely by way of further example, the supersonic cruise conditions may correspond to an operating point of the engine that provides a known required thrust level (for example a value in the range of from 70 kN to 120 kN) at a forward Mach number of 1.50 and standard atmospheric conditions (according to the International Standard Atmosphere) at an altitude of 56000 ft (17000 m).

In use, a turbofan gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect of the disclosure, there is provided an aircraft comprising a turbofan gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect of the disclosure, there is provided a method of operating a turbofan gas turbine engine as described and/or claimed herein. The operation may be at the cruise conditions as defined elsewhere herein (for example in terms of the thrust, atmospheric conditions and Mach Number).

According to an aspect of the disclosure, there is provided a method of operating an aircraft comprising a turbofan gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
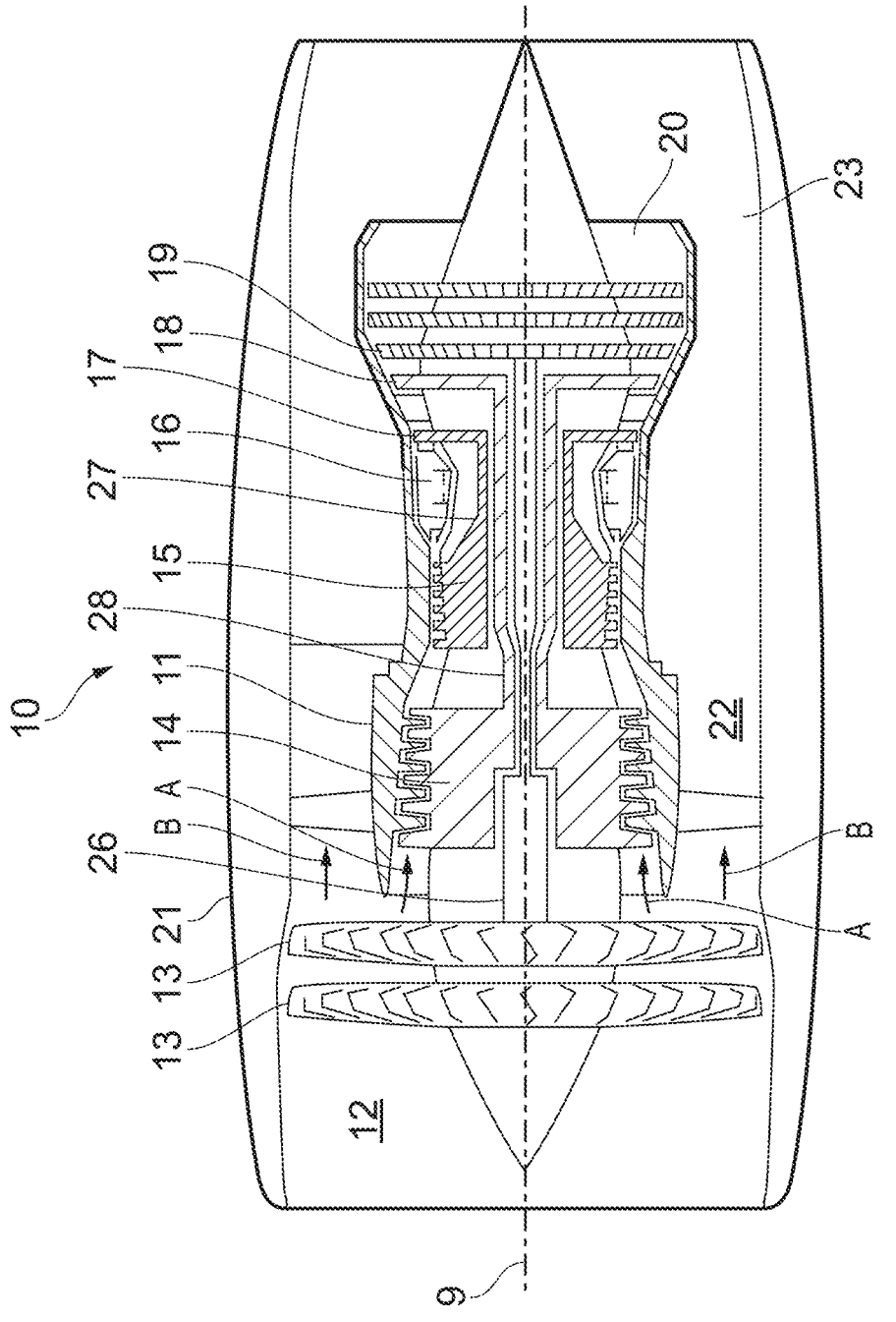
FIG. 1 shows a schematic sectional view of a turbofan gas turbine engine according to the prior art.

FIG. 1 illustrates a gas turbine engine 10 having a principal rotational axis 9. The engine 10 comprises an air intake 12 and a propulsive fan 23 that generates two air-flows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high-pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust.

Note that the terms "low-pressure turbine" and "low-pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine. In some literature, the "low-pressure turbine" and "low-pressure compressor" referred to herein may alternatively be known as the "intermediate-pressure turbine" and "intermediate-pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
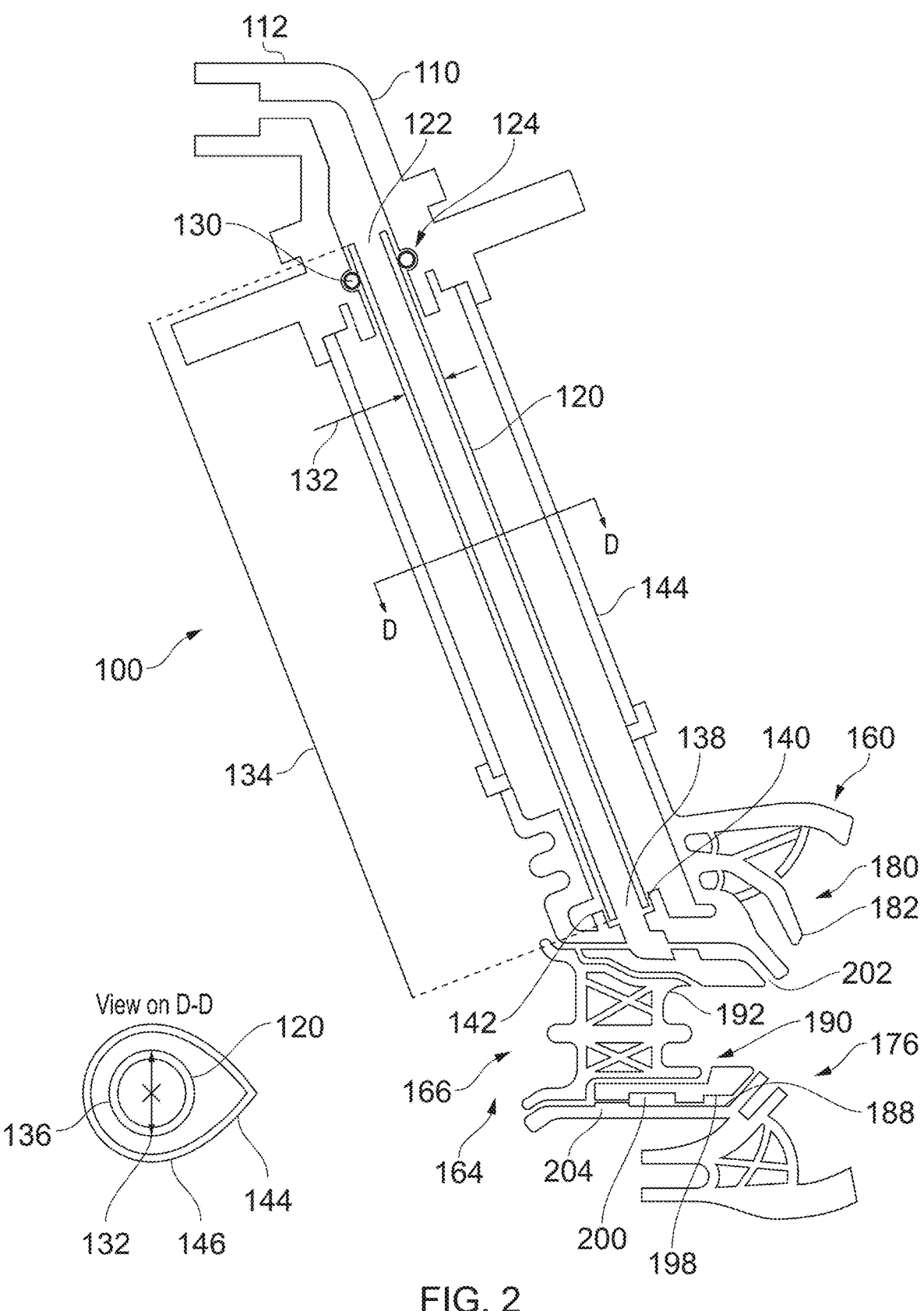
FIG. 2 shows a sectional view of a fuel swirl nozzle according to an embodiment of the disclosure.

FIG. 2 shows a fuel swirl nozzle 100 for a gas turbine engine 10 according to an embodiment of the disclosure. The fuel swirl nozzle 100 comprises, in axial fuel flow sequence, a fuel inlet portion 110, a fuel stem portion 120, and a fuel/air swirler portion 130. The fuel inlet portion 110 includes a fuel restrictor 112. The fuel restrictor 112 may be integral with the fuel inlet portion 110 or, alternatively, the fuel restrictor 112 may be a separate component that fits within the fuel inlet portion 110.

The fuel stem portion 120 has an inlet 122 and a corresponding outlet 138. The inlet 122 to the fuel stem portion 120 is fluidly sealed against the fuel inlet portion 110 by a first sealing element 130. The outlet 138 from the fuel stem portion 120 is fluidly sealed against the fuel/air swirler portion 130 by a second sealing element 142. In the present arrangement, each of the first sealing element 130 and the second sealing element 142 is an O-ring. In alternative arrangements, either or both of the the first sealing element 130 and the second sealing element 142 may be an alternate fluid sealing means.

The fuel/air swirler portion 130 has a first end 164 and a corresponding second end 174. The first end 164 is an air inlet face 166 to the fuel/air swirler portion 130, and the second end being a fuel/air mixture outlet face from fuel/air swirler portion 130.

The first end 164 of the fuel/air swirler portion 130 has a rim portion 168 that encloses the air inlet face 166. The air inlet face 166 has an air inlet face radius (R) 167 that is defined in the axial plane of the air inlet face 166.

The fuel/air swirler 130 comprises two or more swirler portions. In the present arrangement, the fuel/air swirler 130 comprises an outer air swirler 180 and an inner air swirler 190. The outer air swirler 180 has an outer air swirler body 186 that, in turn, has a radially inwardly facing surface 188, and a radially outwardly facing surface 189. The inner air swirler 190 has an inner air swirler body 196 that, in turn, has a radially outwardly facing surface 198.

An annular fuel gallery 200 is formed between the radially inwardly facing surface 188 of the outer air swirler 180, and the radially outwardly facing surface 198 of the inner air swirler 190.

The fuel stem portion 120 extends radially inwardly through the outer air swirler 180 and terminates at the interface (or region) 202 between the outer air swirler 180 and the inner air swirler 190. In this way, a flow of fuel along the fuel stem portion 120 is provided to the annular fuel gallery 200 prior to the atomisation of the fuel into the air flow passing through the outer air swirler 180 and the inner air swirler 190.

In the present arrangement, a heat shielding portion 204 is provided between the outer air swirler 180 and the inner air swirler 190. The heat shielding portion 204 is configured to reduce a transfer of thermal energy between the outer air swirler 180 and the inner air swirler 190. The current embodiment employs an annular air gap between the outer air swirler 180 and the inner air swirler 190 to effect the heat shielding function. In other embodiments, the heat shielding portion 204 may be formed from a thermally insulating material.

The outer air swirler 180 comprises a plurality of first vanes 182 that are arranged in an annular array. The annular array of first vanes 182 are arranged to redirect an air flow passing through the first vanes 182 by a first swirl angle 184. The inner air swirler 190 comprises a plurality of second vanes 192 that are arranged in an annular array. The annular array of second vanes 192 are arranged to redirect an air flow passing through the second vanes by a second swirl angle 194.

In the present arrangement, the first swirl angle 184 is defined in the same direction as the second swirl angle 194. In alternative arrangements, the first swirl angle 184 is defined in an opposite direction to the second swirl angle 194.

The fuel stem portion 120 is an elongate cylinder having an outer diameter (D) 132. The fuel stem portion 120 has a first fluid connection 124 to the fuel inlet portion 110, and a second connection 140 to the fuel/air swirler portion 130.

The fuel swirl nozzle 100 also has a fuel stem shroud 144. The fuel stem shroud 144 encloses an axial length 134 of the fuel stem portion 120. The fuel stem portion 120 has a first cross-sectional profile 136 with a corresponding first drag coefficient. In the present arrangement, the first cross-sectional profile 136 is circular since the fuel stem portion 120 is formed from a tube material.

The fuel stem shroud 144 has a second cross-sectional profile 146 with a corresponding second drag coefficient. The second drag coefficient is less than the first drag coefficient. In other words, the fuel stem shroud 144 is more streamlined that the fuel stem portion 120. In the present arrangement, the second cross-sectional profile 146 is teardrop-shaped (also known as lachrymiform in cross-section).

Figure 3:
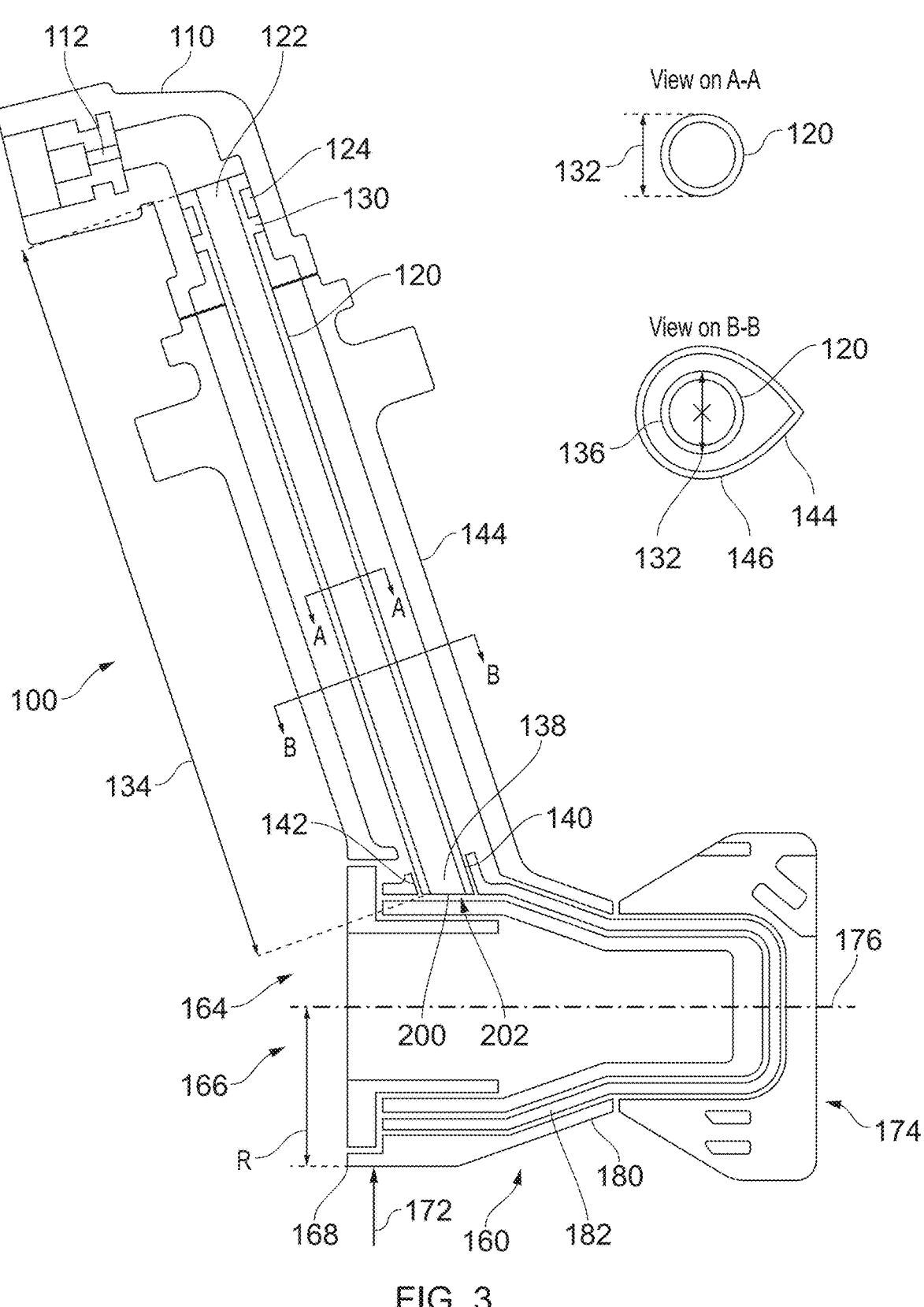
FIG. 3 shows a sectional view of a fuel swirl nozzle according to a further embodiment of the disclosure.

FIG. 3 shows an alternative arrangement for the fuel swirl nozzle 100 for a gas turbine engine 10 according to an embodiment of the disclosure. The fuel swirl nozzle 100 of FIG. 3 also has, in axial fuel flow sequence, a fuel inlet portion 110, a fuel stem portion 120, and a fuel/air swirler portion 130. The fuel inlet portion 110 includes a fuel restrictor 112.

The arrangement of fuel stem portion 120 and fuel stem shroud 144 is identical to that described above for the embodiment of FIG. 2.

In the arrangement of FIG. 3, the fuel/air swirler portion 130 has a cross-sectional profile 162 that is generally dolioform shaped along an axis parallel to the engine longitudinal axis 40. In other words, the fuel/air swirler portion 130 has a generally barrel-shaped cross-sectional profile 162. Returning to the geometry of the cross-sectional profile 162 of the fuel/air swirler portion 130, a diameter of the fuel/air swirler portion 130 increases progressively from the first end 164 to approximately an axial mid-point of the fuel/air swirler portion 130, and the decreases progressively from the axial mid-point to the second end 174 of the fuel/air swirler 130.

The rim portion 168 has a rim portion radius ($r_{rim}$) 170 that is defined in a direction normal to an outer circumference 172 of the air inlet face 166 of the fuel/air swirler portion 130. In one arrangement of the disclosure, the rim portion radius $r_{rim}$ is 0.7 times the air inlet face radius (R) 171.

In the arrangement of FIG. 3, at least one of the first connection 124 and the second connection 140 comprises a blended joint 126 having a joint blend radius ($r_{blend}$) 128.

In the present arrangement, the joint blend radius ($r_{blend}$) 128 is 0.7 times the outer diameter (D) 132 of the fuel stem portion 120.

Figures 4A, 4B, 4C, 4D:
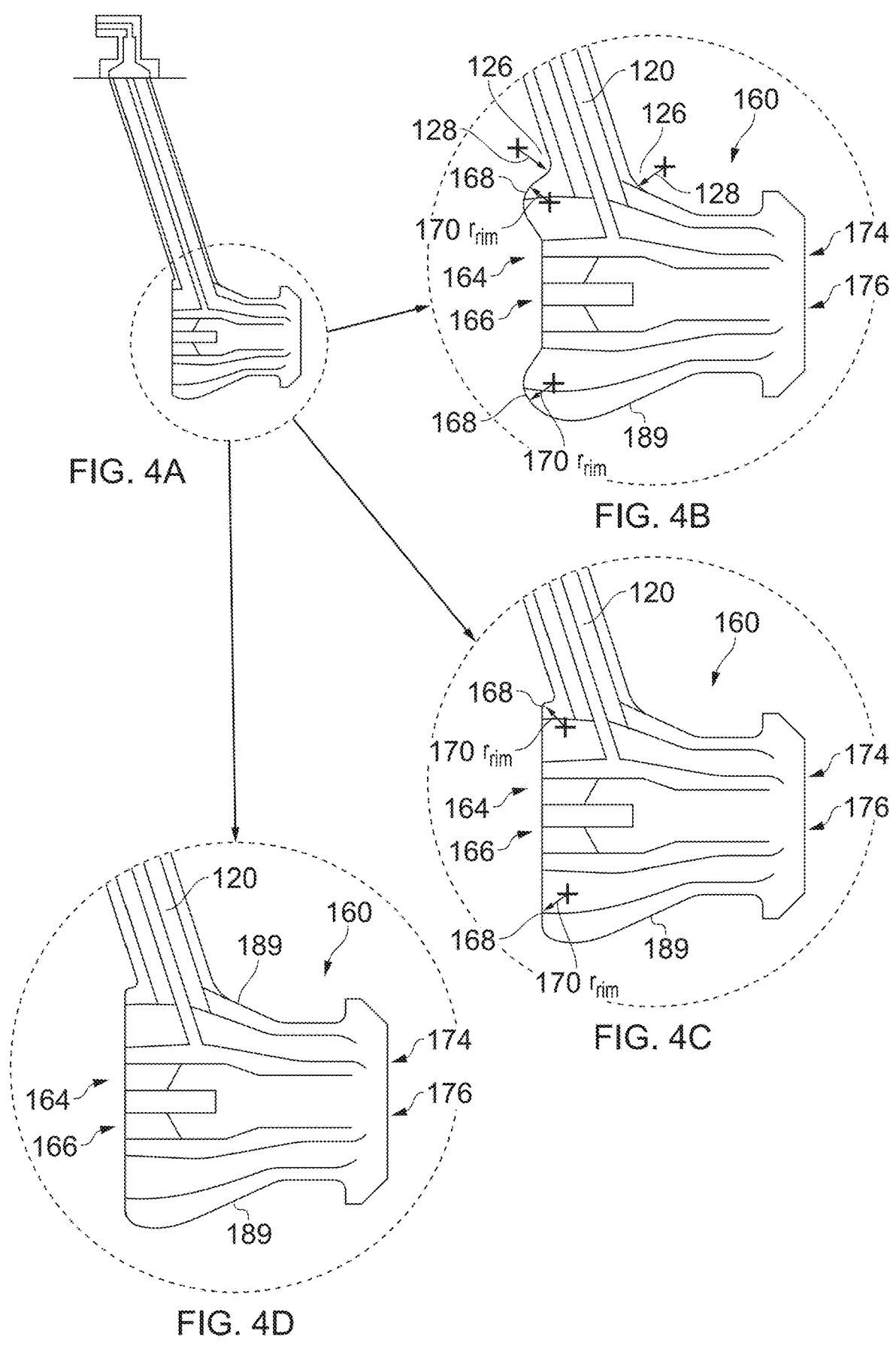
FIG. 4A shows the fuel swirl nozzle of FIG. 3 and highlighting the fuel/air swirler portion.
FIGS. 4B, 4C, 4D, 4E, 4F, and 4G show the fuel/air swirler portion of the fuel swirl nozzle of FIG. 3 with corresponding external surface shape modifications.

FIG. 4A shows an outline view of the fuel swirler nozzle of FIG. 3 albeit with less detail. FIGS. 4B to 4G show alternative external surface geometries in the form of corresponding cross-sectional arrangements.

FIG. 4B shows an alternative form of shaping of the outer surface of the inlet region of the fuel/air swirler portion 130. The second connection 140 at the junction of the fuel stem portion 120 and the fuel/air swirler portion 130 is provided with a blended joint 126.

The rim portion 168 of the air inlet face 166 of the fuel/air swirler portion 130 has a rim portion radius 170 that extends around the rim portion 168 to an underside of the fuel/air swirler portion 130.

FIG. 4C shows a variant of the arrangement of FIG. 4B having the blended joint 126 between the fuel stem portion 120 and the fuel/air swirler portion 130, and the rim portion radius 170 at the air inlet face 166 of the fuel/air swirler portion 130. However, the arrangement of FIG. 4C differs from that of FIG. 4B in that the rim portion radius 170 at the air inlet face 166 is recessed from the first end 164 of the fuel/air swirler portion 130

FIG. 4D shows a further variant of the arrangement of FIG. 4B. The arrangement of FIG. 4D includes only the external shaping of the body of the fuel/air swirler portion 130.

Figures 4E, 4F, 4G:
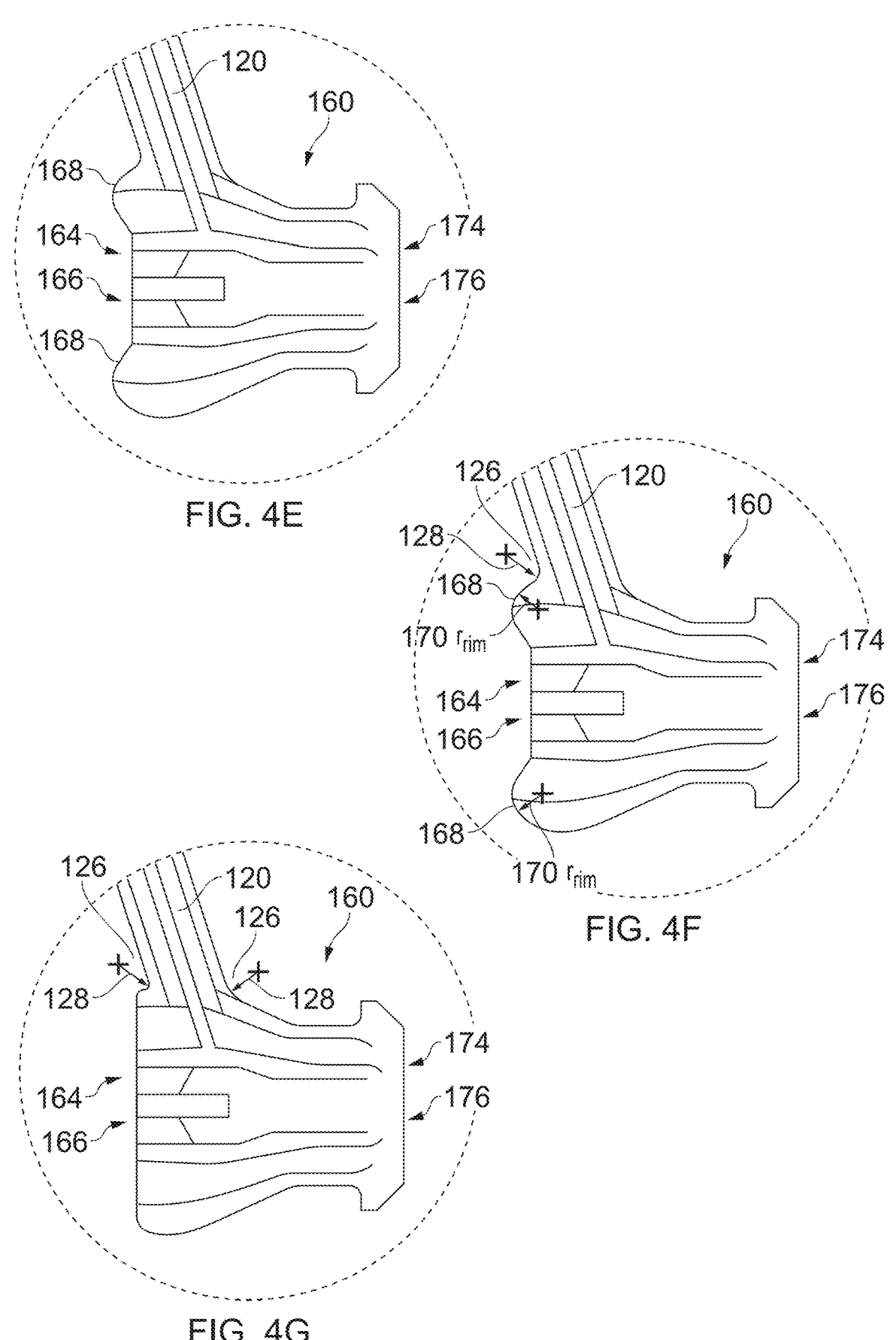

In contrast, the arrangement of FIG. 4E shows a still further variant of the arrangement of FIG. 4B, including only the rim portion radius 170 at the air inlet face 166 of the fuel/air swirler portion 130. The arrangement of FIG. 4E does not include the blended joint 126 between the fuel stem portion 120 and the fuel/air swirler portion 130, and the external shaping of the body of the fuel/air swirler portion 130.

FIG. 4F shows a variant of the arrangement of FIG. 4E in which the rim portion radius 170 at the air inlet face 166 of the fuel/air swirler portion 130 extends further in an upstream direction.

FIG. 4G shows a further variant of the arrangement of FIG. 4B. The arrangement of FIG. 4G includes only the second connection 140 at the junction of the fuel stem portion 120 and the fuel/air swirler portion 130 being provided with a blended joint 126.

Figure 5:
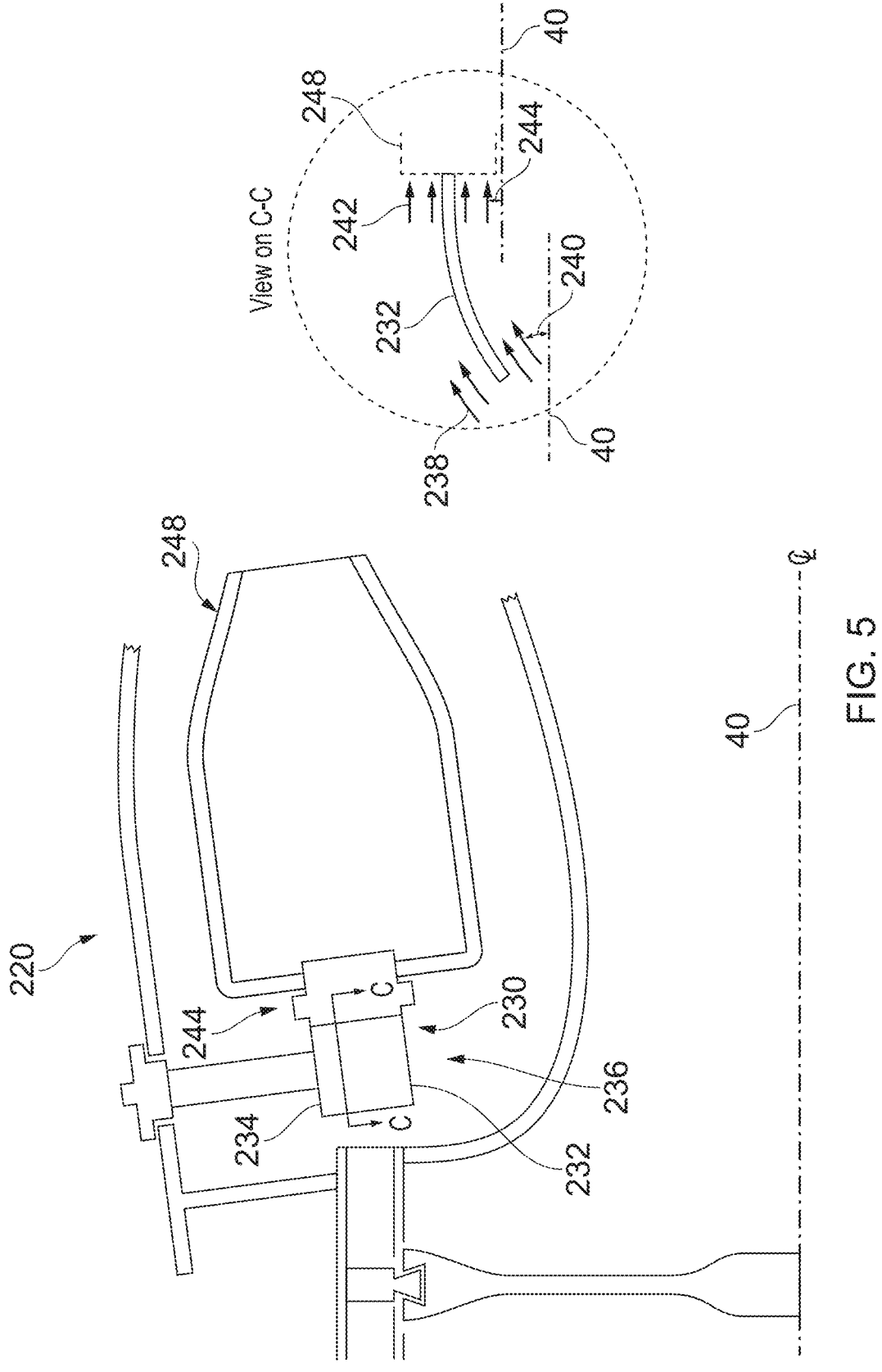
FIG. 5 shows a schematic sectional view of a combustion according to a further embodiment of the disclosure.

FIG. 5 illustrates an integral guide vane combustor assembly 230 for a gas turbine engine 10 according to an embodiment of the disclosure. The gas turbine engine 10 comprises, in axial flow sequence, a compressor assembly 13,14, the integral guide vane combustor assembly 230, a turbine assembly 16,17, and an exhaust assembly 19. The integral guide vane combustor assembly 230 comprises an annular array 236 of radially extending guide vane combustors 230.

Each of the guide vane combustors 230 comprises, in axial flow sequence, a guide vane portion 232, and a combustor body portion 248. The guide vane portion 232 is formed integrally with the combustor body portion 248. The guide vane portion 232 is configured to direct a gas flow exiting the high-pressure compressor assembly 14 into the combustor body portion 248.

In the arrangement of the present disclosure, the annular array 236 of guide vane combustors 230 is formed from 12 individual guide vane combustors 230. In other embodiments of the disclosure, the annular array 236 of guide vane combustors 230 may be comprised of between 6 and 16 guide vane combustors 230.

In the present embodiment, the individual guide vane combustors 230 forming the annular array 236 are circumferentially equally spaced around a circumference of the gas turbine engine 10. In an alternative arrangement, the guide vane combustors 230 may be circumferentially unequally spaced.

The gas flow entering the guide vane portion 232 of the guide vane combustor 230 is directed at a first offset angle 240 relative to a longitudinal axis 40 of the gas turbine engine 10. Correspondingly, the gas flow exiting the guide vane portion 232 is directed at a second offset angle 244 relative to a longitudinal axis 40 of the gas turbine engine 10.

In the present arrangement, the second offset angle is +2°. In alternative arrangements, the second offset angle may be in a range of from +5° to −5°.

Figure 6:
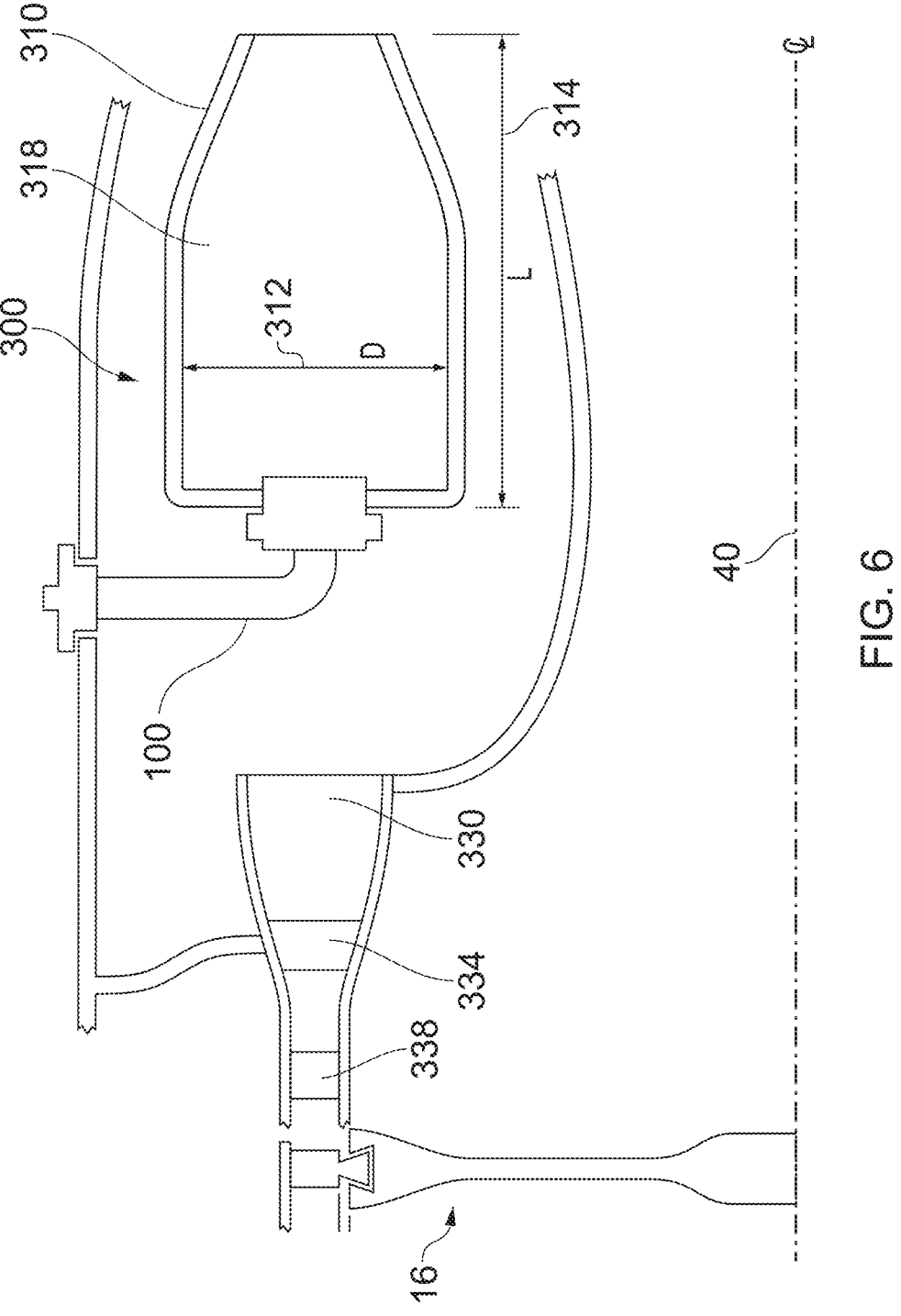
FIG. 6 shows a schematic sectional view of a combustion according to a further embodiment of the disclosure.

FIG. 6 illustrates a combustor assembly 300 for a gas turbine engine 10. The combustor assembly 300 comprises a combustor casing 310 together with an annular array of fuel swirl nozzles 100.

The combustor casing 310 has a diametral height (D) 312 and an axial length (L) 314.

An Aspect Ratio parameter S is defined as:

$$S = \frac{D}{L}$$

In one arrangement of the present disclosure, the diametral height 312 is 185 mm, and the axial length 314 is 370 mm. This provides the arrangement with an S parameter of 0.50.

In the present arrangement, the combustor casing 310 has an internal volume 318 of 0.0375 m³

The annular array of fuel swirl nozzles 100 is composed of 20 individual fuel swirl nozzles that are arranged in an equi-spaced circumferential array.

The configuration of fuel swirl nozzles 100 and the internal volume 318 of the combustor casing 310 defines a Fuel Atomisation Density parameter, $D_{FSN}$ (m⁻³) as follows.

$$D_{FSN} = \frac{N}{V}$$

In the present arrangement, the $D_{FSN}$ parameter has a value of 533.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. An integral guide vane combustor assembly for a gas turbine engine, the gas turbine engine comprising, in axial flow sequence, a compressor assembly, the integral guide vane combustor assembly, a turbine assembly, and an exhaust assembly, the integral guide vane combustor assembly comprising an annular array of radially extending guide vane combustors;

wherein each guide vane combustor comprises, in axial flow sequence, a guide vane portion, and a combustor body portion where a combustion occurs, the guide vane portion being formed integrally with the combustor body portion, and the guide vane portion being configured to direct a gas flow exiting the compressor assembly into the combustor body portion;

wherein the guide vane portion is configured to direct the gas flow entering the guide vane portion to proceed at a first offset angle relative to a longitudinal axis of the gas turbine engine, and is further configured to direct the gas flow exiting the guide vane portion to proceed at a second offset angle relative to the longitudinal axis of the gas turbine engine, the second offset angle is less than the first offset angle, and an absolute value of the second offset angle is not zero, and the first offset angle is a positive value; and wherein, in the annular array of radially extending guide vane combustors, each radially extending guide vane combustor is aligned from a frontend of the guide vane portion to a backend of the combustor body portion along one central longitudinal axis, the front end of the guide vane portion receiving pressurized gas exiting the compressor assembly, and after combustion, combusted gas exiting the combustor body portion via the backend, the one central longitudinal axis is tilted with respect to the longitudinal axis of the gas turbine engine so that the backend of the combustor body portion is disposed radially more outward than the frontend of the guide vane portion, and the annular array of radially extending guide vane combustors comprises between 6 and 16 guide vane combustors.

2. The integral guide vane combustor assembly as claimed in claim 1, wherein the annular array of radially extending guide vane combustors are circumferentially equally spaced.

3. The integral guide vane combustor assembly as claimed in claim 1, wherein each guide vane combustor is formed by an additive layer manufacturing process.

4. The integral guide vane combustor assembly as claimed in claim 1, wherein the absolute value of the second offset angle is not zero and is not greater than five.

5. A gas turbine engine comprising:

in axial flow sequence, a fan assembly, a compressor assembly, an integral guide vane combustor assembly, a turbine assembly, and an exhaust assembly, wherein the integral guide vane combustor assembly comprises an annular array of radially extending guide vane combustors, wherein each guide vane combustor comprises, in axial flow sequence, a guide vane portion, and a combustor body portion where a combustion occurs, the guide vane portion being formed integrally with the combustor body portion, and the guide vane portion being configured to direct a gas flow exiting the compressor assembly into the combustor body portion, wherein the guide vane portion is configured to direct the gas flow entering the guide vane portion to proceed at a first offset angle relative to a longitudinal axis of the gas turbine engine, and is further configured to direct the gas flow exiting the guide vane portion to proceed at a second offset angle relative to the longitudinal axis of the gas turbine engine, the second offset angle is less than the first offset angle, and an absolute value of the second offset angle is not zero, and the first offset angle is a positive value, and the integral guide vane combustor assembly further comprises a plurality of fuel swirl nozzles for the guide vane combustor; and wherein, in the annular array of radially extending guide vane combustors, each radially extending guide vane combustor is aligned from a frontend of the guide vane portion to a backend of combustor body portion along one central longitudinal axis, the front end of the guide vane portion receiving pressurized gas exiting the compressor assembly, and after combustion, the combusted gas exiting the combustor body portion via the backend, the one central longitudinal axis is tilted with respect to the longitudinal axis of the gas turbine engine so that the backend of the combustor body portion is disposed radially more outward than the frontend of the guide vane portion, and the annular array of radially extending guide vane combustors comprises between 6 and 16 guide vane combustors.

6. The gas turbine engine as claimed in claim 5, wherein the fan assembly comprises a plurality of fan blades extending radially from a hub, the plurality of fan blades defining a fan diameter ($D_{FAN}$), and wherein the fan diameter $D_{FAN}$ is within a range of 0.3 m to 2.0 m.

7. The gas turbine engine as claimed in claim 6, wherein the fan diameter $D_{FAN}$ is within the range of 0.4 m to 1.5 m.

8. The gas turbine engine as claimed in claim 6, wherein the fan diameter $D_{FAN}$ is within the range of 0.7 m to 1.0 m.

9. The gas turbine engine as claimed in claim 5, further comprising:

an outer casing, the outer casing enclosing the sequential arrangement of the fan assembly, the compressor assembly, and the turbine assembly, an annular bypass duct being defined between the outer casing and the sequential arrangement of the compressor assembly, and the turbine assembly, a bypass ratio being defined as a ratio of a mass air flow rate through the bypass duct to a mass air flow rate through the sequential arrangement of modules, and wherein the bypass ratio is less than 4.0.

10. The gas turbine engine as claimed in claim 5, wherein the fan assembly has two or more fan stages, at least one of the fan stages comprising a plurality of fan blades defining a fan diameter $D_{FAN}$.

* * * * *